United States Patent
Wang

(10) Patent No.: US 7,279,439 B2
(45) Date of Patent: Oct. 9, 2007

(54) RUG STRUCTURE

(76) Inventor: Chin-Fa Wang, P.O. Box 487, Chang-hua City 500 (TW)

( * ) Notice: Subject to any disclaimer, the term of this patent is extended or adjusted under 35 U.S.C. 154(b) by 270 days.

(21) Appl. No.: 11/102,779

(22) Filed: Apr. 11, 2005

(65) Prior Publication Data

US 2006/0211322 A1   Sep. 21, 2006

(30) Foreign Application Priority Data

Mar. 18, 2005   (TW) ............................... 94204208 U

(51) Int. Cl.
B32B 5/24 (2006.01)
B32B 5/18 (2006.01)
B32B 15/02 (2006.01)

(52) U.S. Cl. .................... 442/222; 442/221; 442/9; 442/10

(58) Field of Classification Search ............ 442/9, 442/10, 221, 222
See application file for complete search history.

(56) References Cited

U.S. PATENT DOCUMENTS

| | | | | |
|---|---|---|---|---|
| 4,144,371 A * | 3/1979 | Okie et al. ................. | 442/3 |
| 5,707,903 A * | 1/1998 | Schottenfeld ................ | 442/30 |
| 5,820,968 A * | 10/1998 | Kurani ....................... | 428/137 |
| 5,863,845 A * | 1/1999 | Owen ......................... | 442/101 |
| 5,874,371 A * | 2/1999 | Owen ......................... | 442/101 |
| 5,906,878 A * | 5/1999 | Horning et al. ............. | 428/131 |
| 6,130,174 A * | 10/2000 | Hawley et al. .............. | 442/43 |
| 6,162,309 A * | 12/2000 | Brodeur et al. ............. | 156/72 |
| 6,221,796 B1 * | 4/2001 | Hawley et al. .............. | 442/43 |
| 6,558,786 B1 * | 5/2003 | Jupina ..................... | 428/316.6 |
| 6,673,179 B1 * | 1/2004 | Mangum et al. ............ | 156/79 |
| 6,794,009 B1 * | 9/2004 | Brodeur et al. ............. | 428/95 |
| 6,794,316 B1 * | 9/2004 | Buscher et al. ............. | 442/32 |
| 2002/0094404 A1 * | 7/2002 | Schottenfeld ............. | 428/41.8 |

* cited by examiner

Primary Examiner—Cheryl A. Juska

(57) ABSTRACT

A rug includes a foam base layer and a top layer which is fixed on a top of the foam base layer. The base layer has a plurality of holes and separation portions which are located between the holes. The top layer is woven by plastic fibers and is a porous top layer. The top layer is conveniently woven by artificial plastic fibers so that different patterns and colors are available. The foam base layer is resilient and the holes are good for ventilation.

1 Claim, 5 Drawing Sheets

RUG STRUCTURE

FIELD OF THE INVENTION

The present invention relates to a rug having a foam base layer and a top layer which is made by artificial fibers.

BACKGROUND OF THE INVENTION

A conventional rug generally includes an anti-slip layer which includes a plurality of holes and a foam material is coated to the anti-slip layer, and a filtering layer is fixed to a top of the anti-slip layer and is made by flexible strings. The filtering layer is fixed to the anti-slip layer along a periphery of the filtering layer by way of heat-pressing. However, the filtering layer includes tiny holes between the strings so that small particles such as pebbles are easily trapped by the strings. The strings are easily stocked by dirt, soils or other sticky stuff, and these kind of stuff stocked on the strings are difficult to be cleaned. Besides, the patterns of the conventional rugs are limited because of the strings.

The present invention intends to provide a rug that consists of a foam base layer and a top layer, and is easily to clean and manufactured. The foam base layer and the top layer are glued together.

SUMMARY OF THE INVENTION

The present invention relates to a rug which comprises a foam base layer having a plurality of holes and separation portions which are located between the holes. A top layer is woven by plastic fibers and fixed to a top of the foam base layer.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
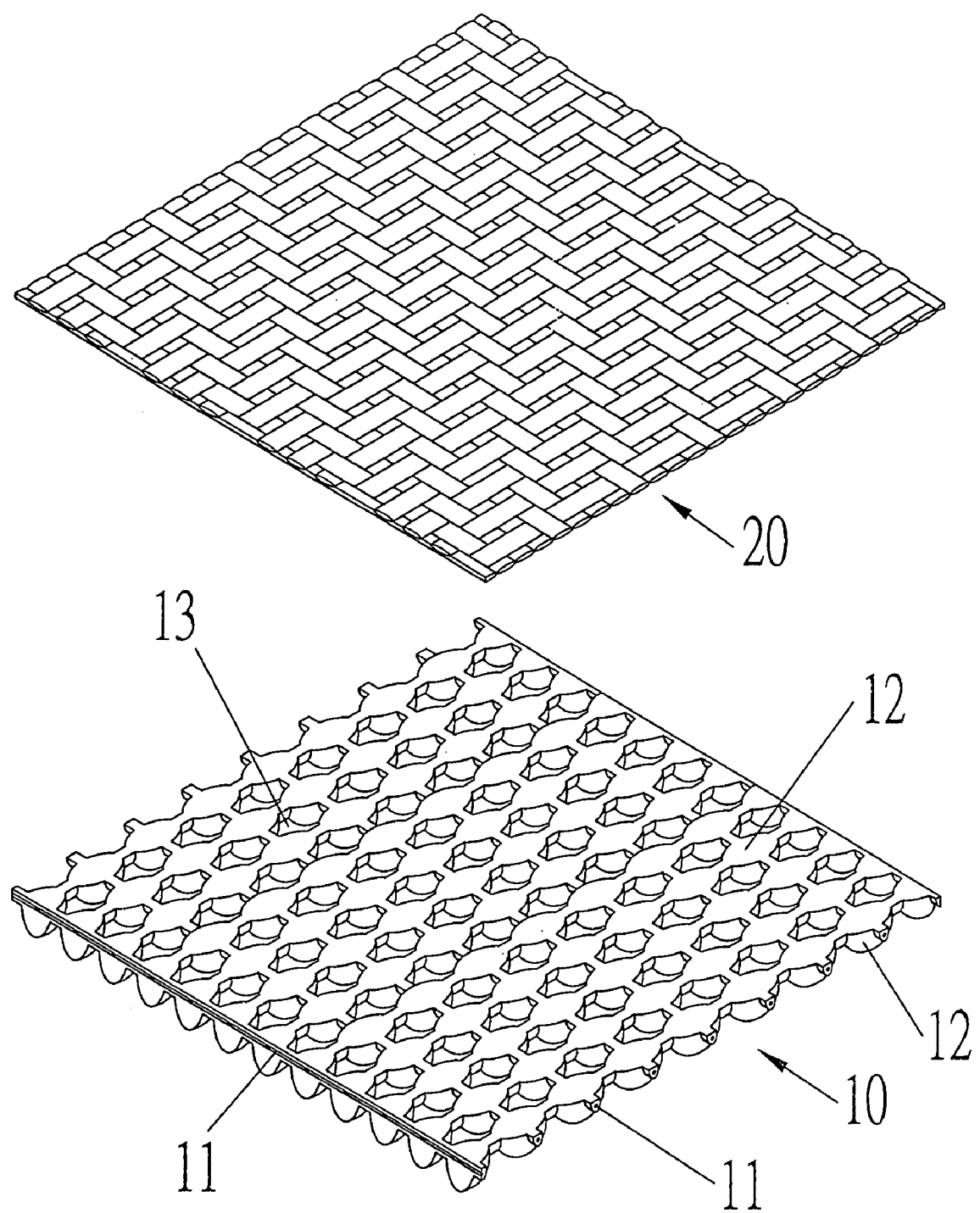
FIG. 1 is an exploded view to show the foam base layer and the top layer of the rug of the present invention.
Figure 2:
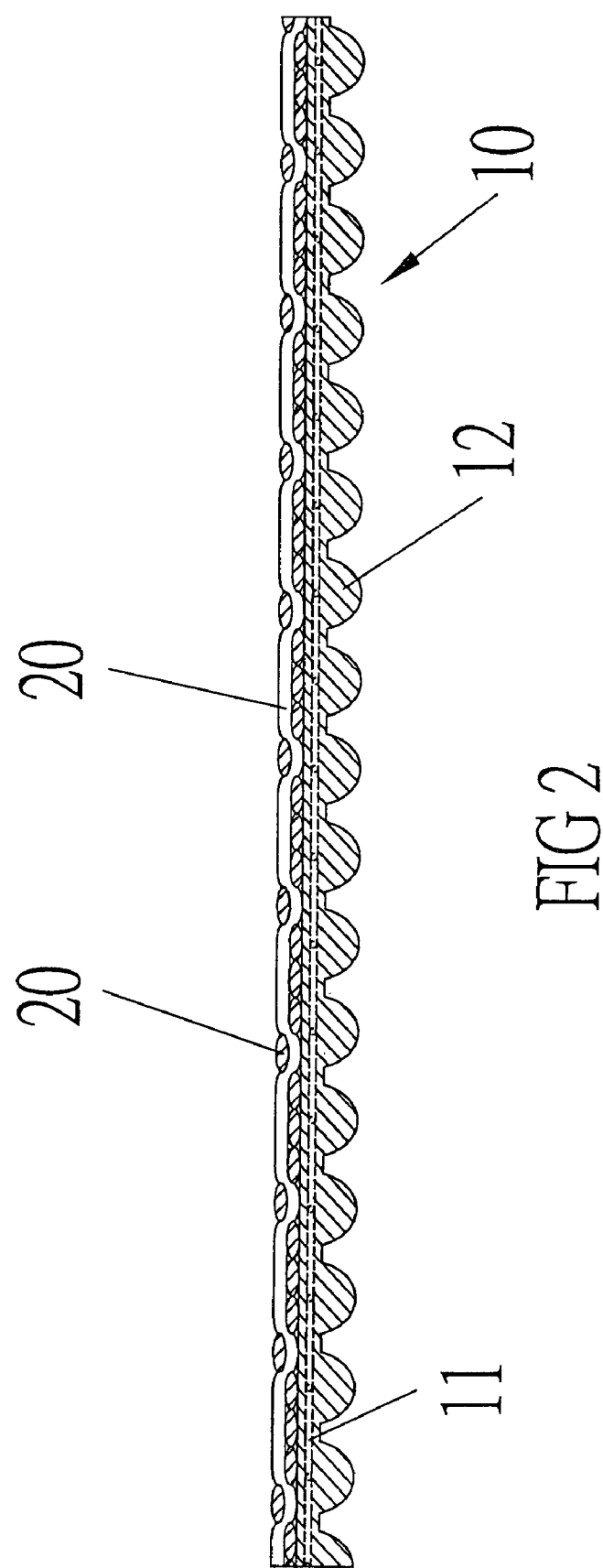
FIG. 2 is a side cross sectional view of the rug of the present invention.
Figure 3:
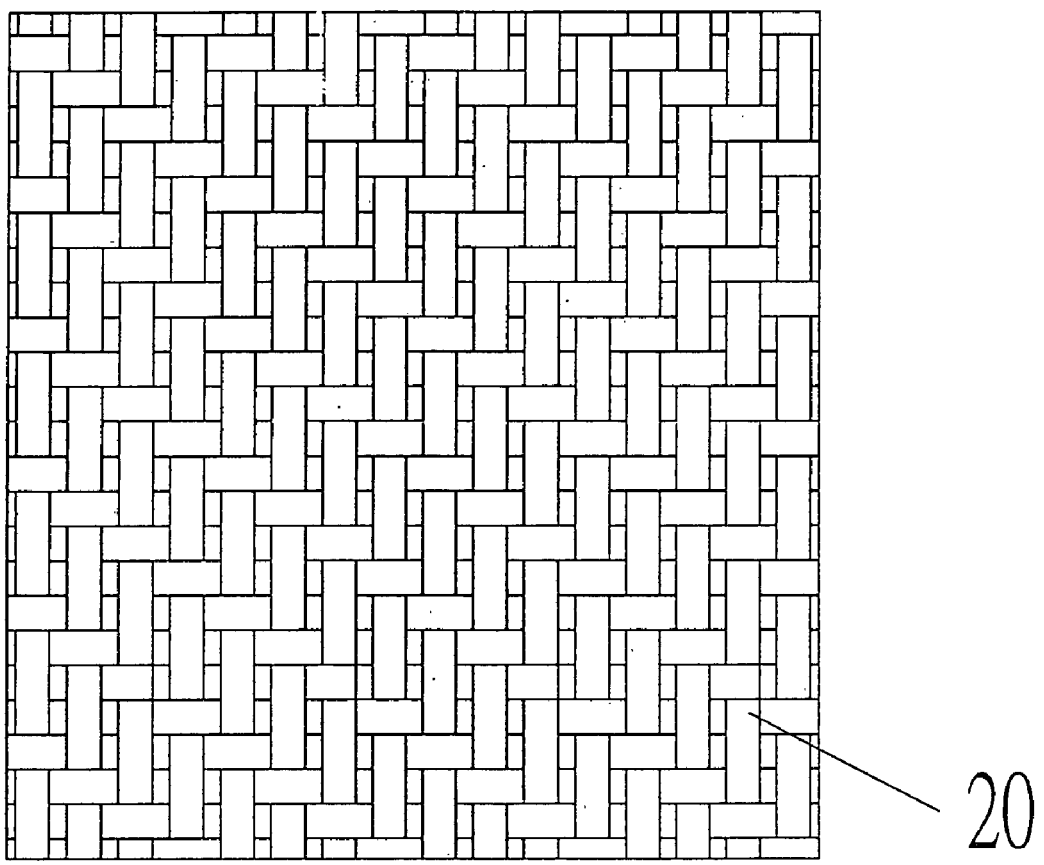
FIG. 3 is a top view of the top layer of the rug of the present invention.
Figure 4:
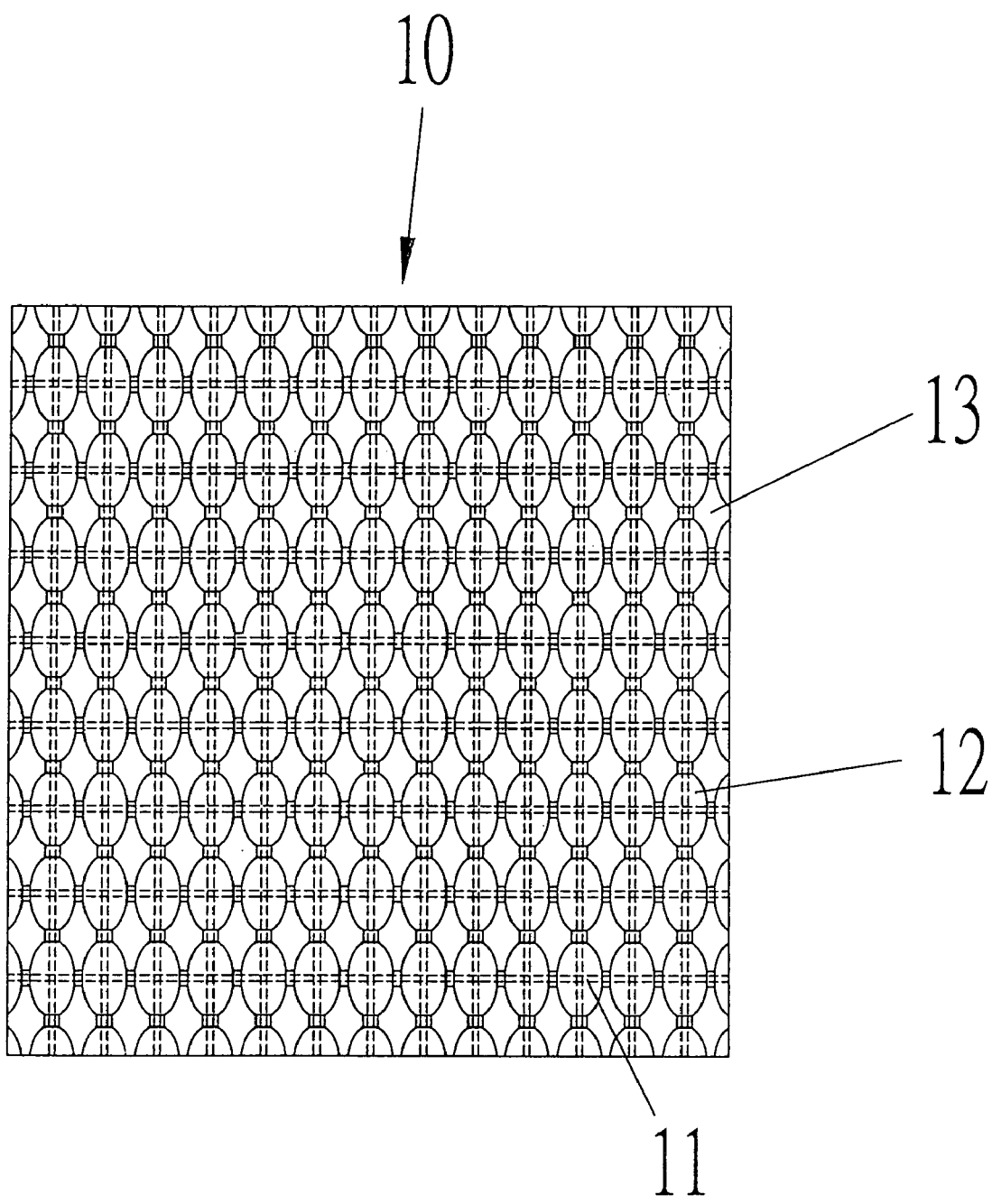
FIG. 4 is a top view of the foam base layer of the rug of the present invention.

Referring to FIGS. 1 to 4, the rug of the present invention comprises a foam base layer 10 and a top layer 20. The base layer 10 consists of wires 11 woven with each other and a Polyvinyl Chloride (PVC) layer is coated to the wires 11. The base layer 10 includes a plurality of holes 13 and separation portions 12 which are located between the holes 13. Each of the separation portions 12 is an oval portion and includes four extensions extending from two axes thereof so as to be connected with an adjacent oval separation portion 12. The foam base layer 10 is strong, water proof, non-slippery and has good ventilation.

The top layer 20 is woven by plastic fibers and fixed to a top of the foam base layer 10 by glue under certain pressure and temperature. The top layer 20 is made by Polypropylene (PP) fibers which are convenient to make in desired colors so that the rugs of the present invention have different patterns and colors available. It is noted that the rugs of the present invention can be made to be any length and width, and can be conveniently cut into desired sections. The rugs are water washable, soft and easily to be cleaned. The plastic fibers for the top layer 20 can also be composite plastic fibers.

Figure 5:
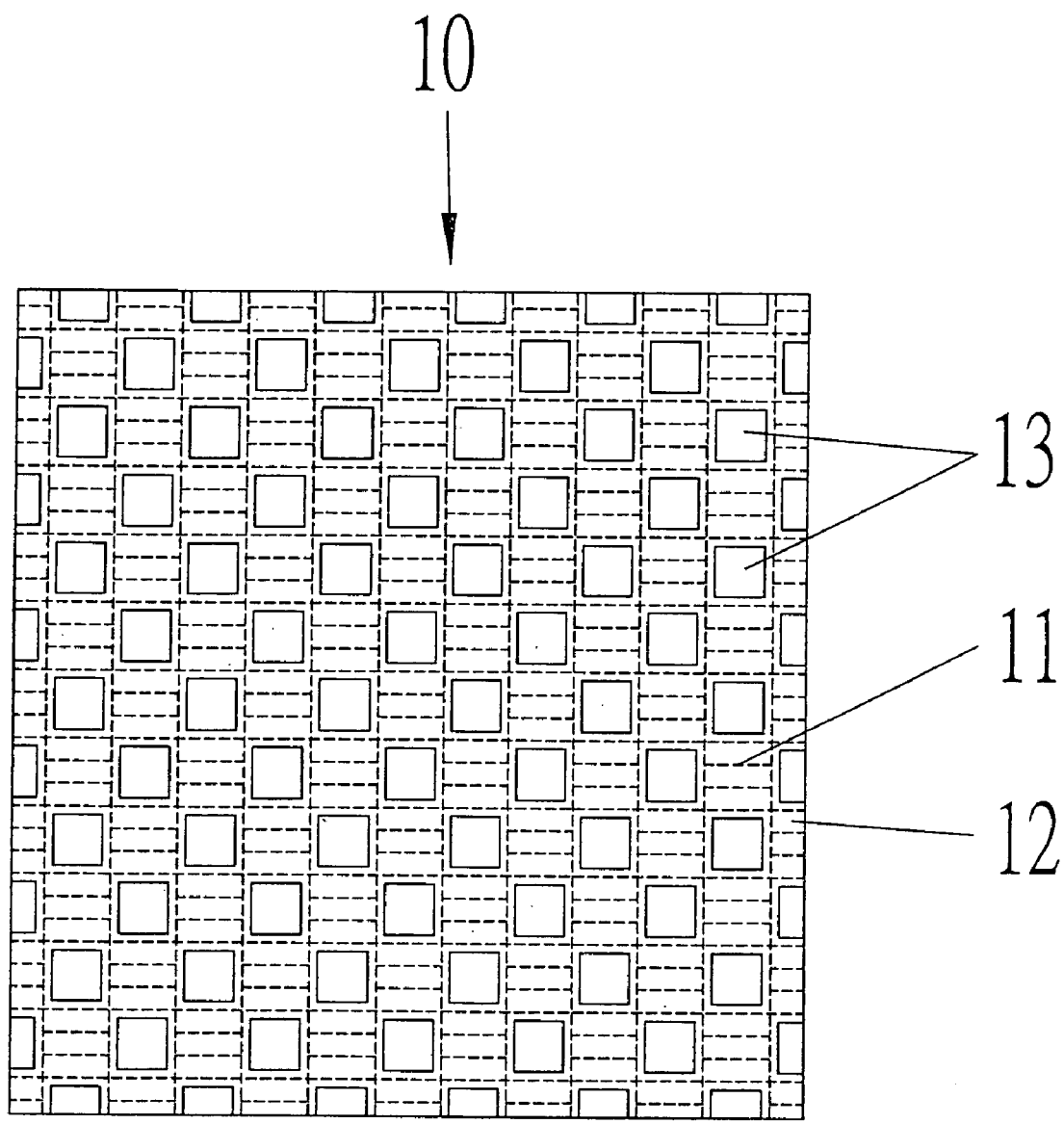
FIG. 5 shows another embodiment of the foam base layer.

FIG. 5 shows another type of foam base layer 10 which has different pattern from that in FIG. 1.

While we have shown and described the embodiment in accordance with the present invention, it should be clear to those skilled in the art that further embodiments may be made without departing from the scope of the present invention.

What is claimed is:

1. A rug comprising:
   a foam base layer consisting of wires woven with each other with a Polyvinyl Chloride (PVC) layer being coated to the said wires, and having a plurality of holes and separation portions which are located between the holes, and
   a top layer woven by plastic fibers and fixed to a top of the foam base layer.

\* \* \* \* \*